(12) United States Patent
Guo et al.

(10) Patent No.: US 12,120,468 B2
(45) Date of Patent: Oct. 15, 2024

(54) DISPLAY APPARATUS AND DISPLAY SYSTEM

(71) Applicant: APPOTRONICS CORPORATION LIMITED, Guangdong (CN)

(72) Inventors: Zuqiang Guo, Guangdong (CN); Peng Du, Guangdong (CN); Yi Li, Guangdong (CN)

(73) Assignee: APPOTRONICS CORPORATION LIMITED, Guangdong (CN)

( * ) Notice: Subject to any disclaimer, the term of this patent is extended or adjusted under 35 U.S.C. 154(b) by 769 days.

(21) Appl. No.: 17/288,874

(22) PCT Filed: Sep. 26, 2019

(86) PCT No.: PCT/CN2019/108006
§ 371 (c)(1),
(2) Date: Apr. 26, 2021

(87) PCT Pub. No.: WO2020/082975
PCT Pub. Date: Apr. 30, 2020

(65) Prior Publication Data
US 2021/0352250 A1    Nov. 11, 2021

(30) Foreign Application Priority Data
Oct. 26, 2018 (CN) .......................... 201811260303.1

(51) Int. Cl.
*H04N 9/31* (2006.01)
*G02B 26/08* (2006.01)
(Continued)

(52) U.S. Cl.
CPC ....... *H04N 9/3152* (2013.01); *G02B 26/0833* (2013.01); *G03B 21/008* (2013.01);
(Continued)

(58) Field of Classification Search
CPC .. H04N 9/3152; H04N 9/3161; H04N 9/3164; H04N 9/3114; G02B 26/0833;
(Continued)

(56) References Cited

U.S. PATENT DOCUMENTS

2006/0119943 A1* 6/2006 Yang .................... H04N 9/3129
359/566
2007/0285797 A1    12/2007 Osetinsky
(Continued)

FOREIGN PATENT DOCUMENTS

| CN | 1727938 A | 2/2006 |
|---|---|---|
| CN | 101515069 A | 8/2009 |

(Continued)

OTHER PUBLICATIONS

State Intellectual Property Office of the People's Republic of China, Office Action and Search Report Issued in Application No. 201811260303.1, Dec. 8, 2021, 16 pages. (Submitted with Partial Translation).

(Continued)

*Primary Examiner* — Magda Cruz
(74) *Attorney, Agent, or Firm* — McCoy Russell LLP

(57) ABSTRACT

A display apparatus and a display system are provided. The display apparatus includes: a narrow-spectrum light source configured to emit narrow-spectrum light in elliptical distribution; a reflection device including a reflection surface for reflecting the narrow-spectrum light to obtain to-be-modulated light; and a light modulation device configured to modulate the to-be-modulated light to obtain image light of an to-be-modulated image. The light modulation device includes a modulation surface configured to receive the to-be-modulated light, the modulating surface is at a preset angle to an optical axis of the to-be-modulated light such that the to-be-modulated light forms a circle light spot on the modulating surface. The narrow-spectrum light complying with the elliptical distribution is incident onto the light modulation device to form a circle light spot, thereby helping the light modulation device to emit image light in circular angular distribution, improving light effect and achieving better image display quality.

20 Claims, 13 Drawing Sheets

(51) Int. Cl.
*G03B 21/00* (2006.01)
*G03B 21/20* (2006.01)

(52) U.S. Cl.
CPC ..... *G03B 21/2033* (2013.01); *G03B 21/2066* (2013.01); *G03B 21/2073* (2013.01); *G03B 21/208* (2013.01); *H04N 9/3161* (2013.01); *H04N 9/3164* (2013.01)

(58) Field of Classification Search
CPC ............ G02B 19/0066; G02B 27/0977; G02B 27/18; G03B 21/008; G03B 21/2033; G03B 21/2066; G03B 21/2073; G03B 21/208; G03B 21/00; G03B 21/20; G03B 21/206
See application file for complete search history.

(56) References Cited

U.S. PATENT DOCUMENTS

| | | | | |
|---|---|---|---|---|
| 2013/0321890 | A1* | 12/2013 | Ishida | G02B 27/0172 359/200.7 |
| 2014/0078473 | A1* | 3/2014 | Kusaka | G02B 27/0972 353/31 |
| 2016/0057397 | A1* | 2/2016 | Kurosaki | G02B 27/0927 353/31 |
| 2017/0285452 | A1* | 10/2017 | Miura | G03B 21/208 |

FOREIGN PATENT DOCUMENTS

| | | |
|---|---|---|
| CN | 102183822 A | 9/2011 |
| CN | 102789055 A | 11/2012 |
| CN | 202676983 U | 1/2013 |
| CN | 103454765 A | 12/2013 |
| CN | 103597400 A | 2/2014 |
| CN | 103676144 A | 3/2014 |
| CN | 104808426 A | 7/2015 |
| CN | 106199783 A | 12/2016 |
| CN | 106842785 A | 6/2017 |
| CN | 107193177 A | 9/2017 |
| CN | 107861250 A | 3/2018 |
| JP | H11277278 A | 10/1999 |
| JP | 2003307710 A | 10/2003 |
| JP | 2010032797 A | 2/2010 |
| JP | 2011197217 A | 10/2011 |

OTHER PUBLICATIONS

ISA China National Intellectual Property Administration, International Search Report Issued in Application No. PCT/CN2019/108006, Jan. 8, 2020, WIPO, 4 pages.

* cited by examiner

DISPLAY APPARATUS AND DISPLAY SYSTEM

CROSS REFERENCE TO RELATED APPLICATIONS

The present application is a U.S. National Phase of International Application No. PCT/CN2019/108006 entitled "DISPLAY APPARATUS AND DISPLAY SYSTEM," and filed on Sep. 26, 2019. International Application No. PCT/CN2019/108006 claims priority to Chinese Patent Application No. 201811260303.1 filed on Oct. 26, 2018. The entire contents of each of the above-listed applications are hereby incorporated by reference for all purposes.

TECHNICAL FIELD

The present disclosure relates to a technical field of projection, and particularly to a display apparatus and a display system.

BACKGROUND AND SUMMARY

This part is intended to provide background and context for specific implementations of the present disclosure described in claims. Descriptions herein are not acknowledged to be prior technologies due to be included in this part.

In light sources of projection systems, light intensity distributions of light sources, such as a lamp bulb, a LED and phosphor, are Lambertian distribution. A light beam emitted from the light source is efficiently collected by an optical system, and the light intensity distribution is a circle flat-topped distribution. A laser source emits Gauss light beams, which has an angle light intensity distribution of Gaussian distribution after passing the above optical system.

A reflection device, particularly a total internal reflection prism (a TIR prism), is generally applied to a projection system having a reflective spatial light modulator such as a DLP. The reflection device distinguishes modulated light for modulation and image light for projection, by a total reflection principle. However, when the modulated light is incident to a spatial light modulator (e.g. DMD) through the total internal reflection prism, an optical axis of the modulated light is at an angle to a normal direction of a plane in which the DMD is located. This angle is two times a rotation angle of micro-mirrors in the DMD. If the modulated light irradiates along a bottom or a side surface of the DMD, a light intensity distribution thereof changes, and the angle in an irradiation direction may be increased.

Referring to FIG. 1 which is a schematic diagram of an angle distribution of light incident to a total internal reflection prism and a DMD surface in an existing technology. FIG. 1A is a schematic diagram of an angle distribution of light incident to the total internal reflection prism, while FIG. 1B is a schematic diagram of an angle distribution of light incident to the DMD surface. The angle distribution is a circular angle distribution when the light is incident to a reflection surface r of the total internal reflection prism, in which a beam divergence angle distributes uniformly within a range of $[-a, a]$. After passing the reflection surface r of the total internal reflection prism, light with an elliptical angle distribution is obtained, which will be incident to the DMD surface. Specifically, in one direction, the beam divergence angle on the DMD surface distributes uniformly within a range of $[-b, b]$, wherein $b>a$. In order that a total of image light modulated and emitted by the DMD can pass a diaphragm of a projection lens, i.e., an elliptical light spot on a section of emitting light of the DMD is completely contained in the diaphragm of the lens, it is necessary to reduce an angle of the modulated light accordingly, i.e. to reduce etendue of the light source. The etendue of the light source, such as the lamp bulb and the LED, cannot change, thus leading to a loss of luminous efficacy. Alternatively, a type of light source with a low-brightness can be chosen. For a phosphor light source, it is required to reduce a size of an excitation light spot, so as to increase the excited power density of the phosphor, thus rendering a low brightness of the light source.

Based on the above, an angle increment $(b-a)/a$ of incident light of DMD has a positive correlation with the rotation angle of micro-mirrors in the DMD. For increasing a contrast of a DLP projector, the rotation angle of the micro-mirrors is increased from an original 10° to 12°, until 17° in the existing TRP technology. Therefore, the light passes the total internal reflection prism 901 to form an elliptical distribution, a long axis and a short axis thereof largely differ from each other, and a filling rate of the angle distribution of the image light in the lens diaphragm further reduces. In actual projection, it is necessary to set a short axis direction of the elliptical distribution slightly smaller than the diaphragm of the lens, such that the diaphragm is filled with light completely, thereby losing the light at an edge in the long-axis direction and rendering a low optical utilization of the system.

Referring to FIG. 2, FIG. 2 is a structure schematic diagram of a conventional projection device 10.

The light source 111 is generally a LED or phosphor, which emits Lambertian light, and the Lambertian light is collected through lenses. Alternatively, the light source is a lamp bulb, an electric arc of which emits Lambertian light, and the Lambertian light is collected through a reflector cup and then is emitted. The light emitted from the light source 111 converges at an entrance of a light homogenizing device 114 through a collection lens 112. The light beam emitted from the light source 111 is filtered by a color wheel 113, to provide a sequential monochrome modulated light to the light modulation device 902. After being homogenized through the light homogenizing device 114, the modulated light is incident to the reflection surface r of the total internal reflection prism 901 through a reflection mirror and a relay prism, and passes an internal total reflection surface r of the total internal reflection prism to the light modulation device 902 by a total reflection. The light modulation device 902 receives an image signal to modulate the light, and the reflected image light emits from the total internal reflection prism 901, and enters the lens 903 finally.

Referring to FIG. 3 in combination with FIG. 2, FIG. 3A is a schematic diagram of an angle distribution of light emitted by the light source 111 shown in FIG. 2 on the reflection surface r of the total internal reflection prism 901. FIG. 3B is a diagram of an angle distribution of light incident to the light modulation device 902 shown in FIG. 2. In a transforming process of the etendue in a light path, a Lambertian light intensity distribution generated by the light source 111 is transformed to a circular angle distribution at the entrance of the light homogenizing device 114. As shown in FIG. 3A, a divergence angle of the light in each direction on a lighting section is in a range of $[-a, a]$, and then is transformed into a circular angle distribution incident on the reflection surface r of the total internal reflection prism 901. The light is full-reflected by the total internal reflection prism 901 to obtain the light incident to the light modulation device 902. As shown in FIG. 3B, the angle distribution is an elliptical distribution, and an angle distribution range of the light in a Y-axis direction of the drawing is extended to a range of [−b, b], and an angle distribution range of the light in an X-axis direction of the drawing remains to a range of [−a, a], where the X-axis direction is a horizontal direction in the page, and the Y-axis direction is a vertical direction in the page.

Generally, the lens diaphragm is in a shape of circle, and a size of the light beam emitted from the light modulation device 902 in a short-axis direction may be set to be slightly smaller than a diaphragm diameter of the lens 903, such that the diaphragm of the lens 903 is filled with light completely. However, this may lead to lose part of the light emitted from the light modulation device 902 in the long-axis direction, thus rendering a low light efficiency of the system. In order that the light emitted from the light modulation device 902 can be collected by the lens 903 completely to achieve a relatively high optical efficiency, a size of the elliptical distribution of the light in the long-axis direction is set to be slightly smaller than the diaphragm diameter of the lens 903 and then there will be a relatively large empty region in the short-axis direction, thus lowering a quality of the emitted image of the projection device.

In view of this, a display apparatus is provided according to the present disclosure, which is advantageous to a circle distribution of a light incident to a surface of a light modulation device, thus increasing a quality of an emitted image of the display apparatus on a basis of a relatively high optical utilization of the display apparatus.

A display apparatus includes:
- a narrowband light source configured to emit a narrowband light with an elliptical distribution;
- a reflection device including a reflection surface, where the reflection surface is configured to reflect the narrowband light to obtain a light to be modulated;
- a light modulation device configured to modulate the light to be modulated, to obtain an image light of an image to be displayed, where the light modulation device includes a modulating surface configured to receive the light to be modulated, the modulating surface is at a preset angle to an optical axis of the light to be modulated such that the light to be modulated forms a circle light spot on the modulating surface.

A display system includes a wideband light source and a display apparatus as described above,
- wherein the wideband light source is configured to emit a wideband light for modulation for an image in a first color gamut, and the narrowband light emitted from the narrowband light source is used for modulation for an image in a second color gamut, the second color gamut covers the first color gamut and has a part beyond the first color gamut, the wideband light and the narrowband light are combined by etendue to irradiate the reflection device.

In the present disclosure, an angle distribution of the narrowband light emitted from the narrowband light source is set to be an elliptical distribution and the modulating surface of the light modulation device is at a preset angle to the optical axis of the light to be modulated, such that the light to be modulated forms a circle light spot on the modulating surface, which is advantageous for the light modulation device to emit an image light with a circular angle distribution to the lens diaphragm and is advantageous to increase an optical utilization of the display apparatus and the display system and to achieve a better image display effect.

BRIEF DESCRIPTION OF THE FIGURES

In order to describe embodiments/implementations of the present disclosure more clearly, accompanying drawings required to be used in embodiments/implementations will be described briefly below. Obviously, the accompanying drawings described below are some embodiments/implementations of the present disclosure, and a person skilled in the art can also obtain further drawings according to these drawings without creative efforts.

MAIN REFERENCE NUMERALS OF ELEMENTS

| | |
|---|---|
| Projection device | 10 |
| Light source | 111 |
| Collection lens | 112 |
| Color wheel | 113 |
| light homogenizing device | 114 |

-continued

| | |
|---|---|
| Total internal reflection prism | 901 |
| Reflection surface | r |
| Light modulation device | 902 |
| Lens | 903 |
| Display apparatus | 20, 30, 50, 60 |
| Display system | 70 |
| Narrowband light source | 210, 410, 510 |
| Wideband light source | 720 |
| Light emitting body | 721 |
| Reflection mirror | 725 |
| Wavelength conversion device | 726 |
| Shaping light source | 211, 311, 411, 511, 611 |
| Convergent lens | 212, 312, 412, 512 |
| Scattering element | 213, 413, 513 |
| light homogenizing device | 214 |
| First array | 2111, 3111, 4111, 5111, 6111 |
| Second array | 3112, 4112, 5112, 6112 |
| Third array | 4113, 6113 |
| Fourth array | 6114 |
| First mirror group | 2115, 3115, 4115 |
| First reflection mirror | 2115a, 4115a |
| First light-combining element | 5115, 6115 |
| Film-coated area | 5115a |
| Non-film-coated area | 5115b |
| First polarization state conversion element | 3116 |
| Second mirror group | 4116 |
| Second reflection mirror | 4116a |
| Second light-combining element | 6116 |
| First polarization light-combining component | 3117 |
| First polarization light-combining element | 3117a |
| Second polarization state conversion element | 6117 |
| Second polarization light-combining component | 6118 |

The present disclosure will be further illustrated by specific implementations below in combination with the above drawings.

DETAILED DESCRIPTION

For understanding the above objectives, features and advantages of the present disclosure more clearly, detailed description of the present disclosure will be made with combination to the accompanying drawings and specific implementations. It is noted that embodiments and features thereof in the present disclosure can be combined without conflicting with each other.

In the description below, some specific details are illustrated so as to make full understanding of the present disclosure. However, the described embodiments are only part of embodiments of the present disclosure, and not all embodiments. Based on the embodiments in the present disclosure, all other embodiments obtained by a person skilled in the art without creative efforts fall in the protection scope of the present disclosure.

Unless defined otherwise, all technical and scientific terms used herein have identical meanings generally understood by a person skilled in the art. Herein, terms used in the description of the present disclosure are only for an aim of describing specific embodiments, and not intended to limit the present disclosure.

Figures 1A, 1B:
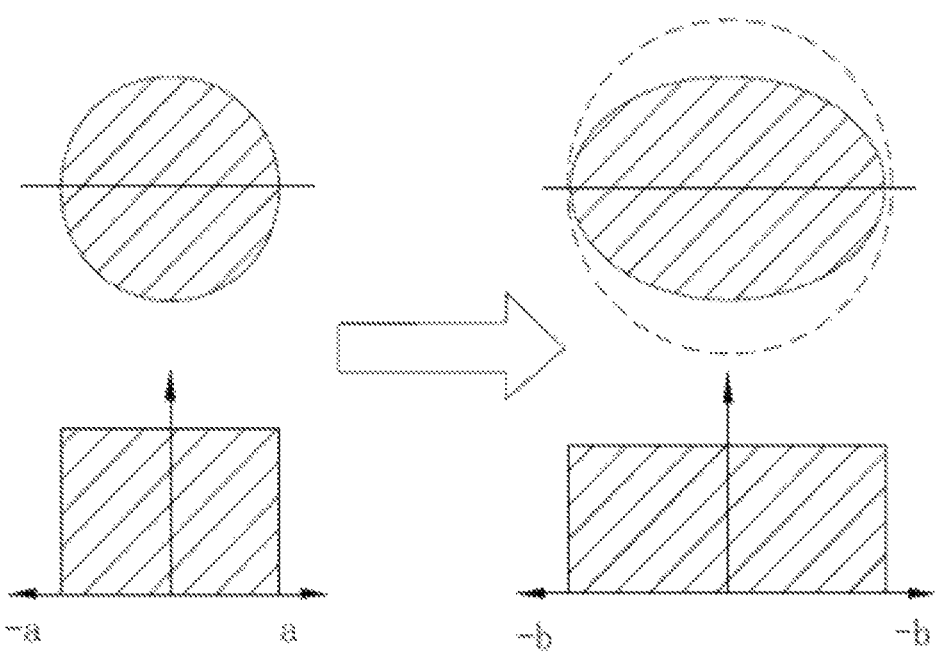
FIG. 1 is a schematic diagram of an angle distribution of light incident to a total internal reflection prism and a DMD surface in a prior technology.
Figure 2:
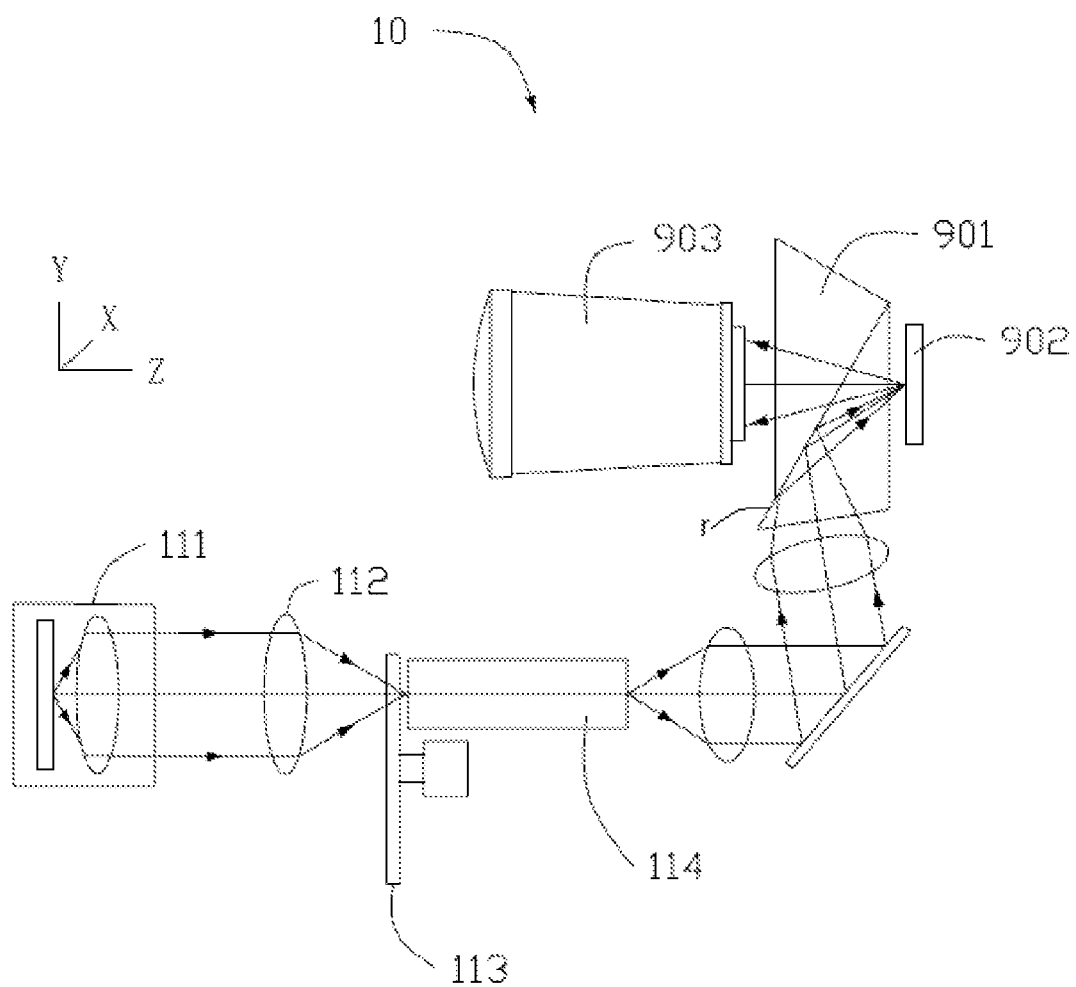
FIG. 2 is a structure schematic diagram of a conventional projection device.
Figure 3A:
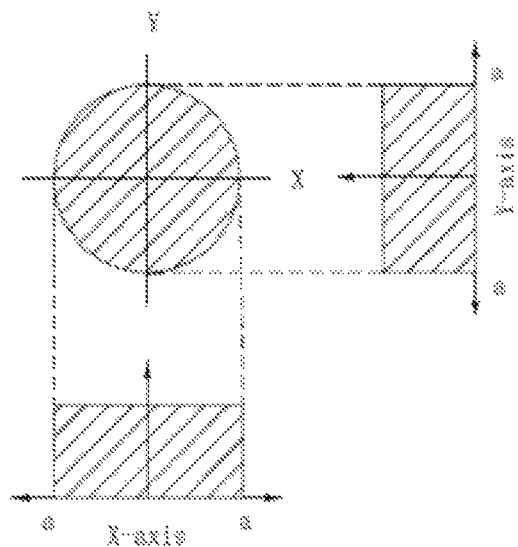
FIG. 3A is a schematic diagram of an angle distribution of light emitted by a light source shown in FIG. 2 on a surface of the total internal reflection prism.
Figure 3B:
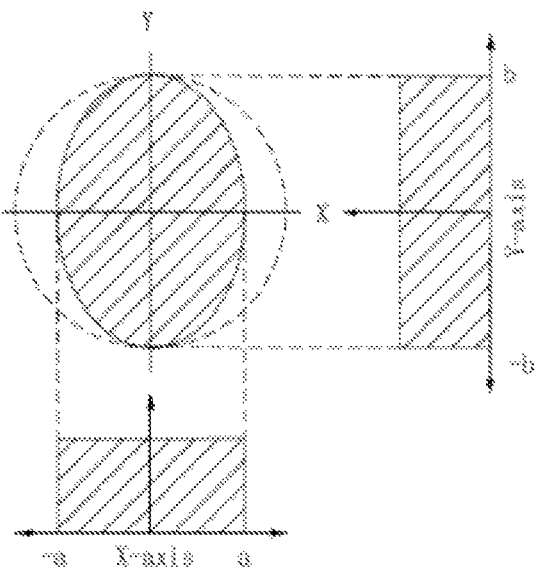
FIG. 3B is a schematic diagram of an angle distribution of light incident to the light modulation device shown in FIG. 2.
Figure 4:
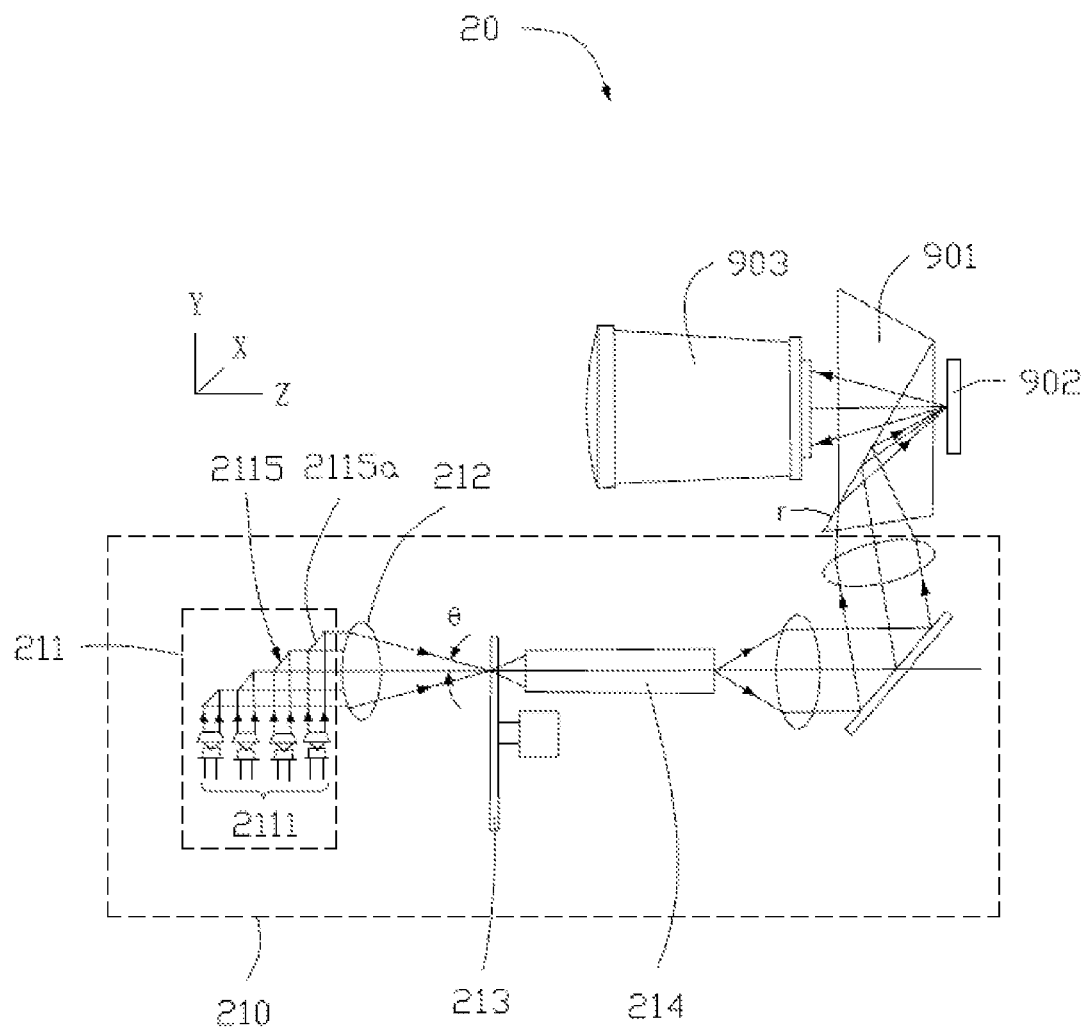
FIG. 4 is a structure schematic diagram of a display apparatus provided in a first implementation of the present disclosure.

Referring to FIG. 4, FIG. 4 is a structure schematic diagram of a display apparatus 20 provided in a first implementation of the present disclosure. The display apparatus 20 may be a device such as an education projector, a cinema projection apparatus, or a micro projector. The display apparatus 20 includes a narrowband light source 210, a reflection device, a light modulation device 902 and a lens 903.

Here, the narrowband light source 210 is used to emit narrowband light with an elliptical distribution. A long-axis direction and a short-axis direction of the elliptical distribution of the narrowband light emitted from the narrowband light source 210 correspond to an X-axis direction and a Y-axis direction shown in FIG. 4, respectively. Specifically, the X-axis direction in FIG. 4 is a direction vertical to the paper, and the Y-axis direction in FIG. 4 is a lateral direction of the paper. The reflection device may be a total internal reflection prism 901. It is understood that the reflection device may also be another reflection element or component. The total internal reflection prism 901 includes a reflection surface r to which the narrowband light is incident. The narrowband light is reflected by the reflection surface r, to obtain light to be modulated. The light modulation device 902 is used to modulate the light to be modulated, to obtain an image light of an image to be displayed. The light modulation device 902 includes a modulating surface for receiving the light to be modulated. The modulating surface is at a preset angle to an optical axis of the light to be modulated. The preset angle may be an acute angle or an obtuse angle corresponding to the above elliptical distribution. A ratio of a size in the long-axis direction of the elliptical distribution to a size in the short-axis direction of the elliptical distribution are matched with the preset angle, such that the light to be modulated with the elliptical distribution forms a circular light spot on the modulating surface, which is advantageous for the light modulation device 902 to emit an image light with a circular angle distribution. The lens 903 is used to direct the image light to emit from the display apparatus 20, to obtain a display image.

In the present disclosure, an angle distribution of the narrowband light emitted from the narrowband light source 210 is set to be an elliptical distribution and the modulating surface is at a preset angle to the optical axis of the light to be modulated beam, such that the light to be modulated with the elliptical distribution forms a circular light spot on the modulating surface, which is advantageous for the light modulation device 902 to emit an image light with a circular angle distribution. The angle distribution of the image light is matched with a diaphragm shape of the lens 903, which is advantageous to increase an optical utilization of the display apparatus 10 and achieve a better image display effect.

In an implementation, besides the above elliptical distribution, the angle distribution of the narrowband light may be a rectangular distribution or other angle distributions with a difference in two orthogonal directions. The narrowband light is directed to the light modulation device 902 to form a circular light spot, which is advantageous to reduce a difference of the angle distribution in different directions, thus increase the optical utilization of the display apparatus 20 and achieve a better image display effect.

Specifically, the narrowband light source 210 includes a shaping light source 211, a convergent lens 212 and a scattering element 213. In this implementation, the scattering element 213 is a scattering wheel.

Herein, the shaping light source 211 is used to emit a light beam array including laser light. The light beam array forms multiple discrete first light spots on the convergent lens 212. The light beam array are converged in the vicinity of the scattering element 213 through the convergent lens 212. The scattering element 213 is used to scatter the converged light beam array, to obtain the narrowband light. It is understood that the narrowband light source 210 further includes a light homogenizing device 214 for homogenizing the narrowband light.

The shaping light source 211 includes a light emitting array and a shaping component. Here, the light emitting array is used to emit multiple beams of laser light. The shaping component is used to direct the multiple beams of laser light to emit along the same optical path to obtain the light beam array, and is used to adjust an interval of multiple first light spots on the convergent lens 212 in the short-axis direction of the elliptical distribution, such that a size of an overall profile of the multiple first light spots in the short-axis direction of the elliptical distribution is smaller than that in the long-axis direction of the elliptical distribution.

The light emitting array includes a first array 2111 for emit multiple beams of first light. The first light is laser light. The shaping component includes a first mirror group 2115. The first mirror group 2115 includes multiple first reflection mirrors 2115a with a stepped arrangement, and the multiple first reflection mirrors 2115a are in a one-to-one correspondence with the multiple beams of first light. Each beam of first light is reflected to the convergent lens 212 through a corresponding first reflection mirror 2115a.

Figure 5A:
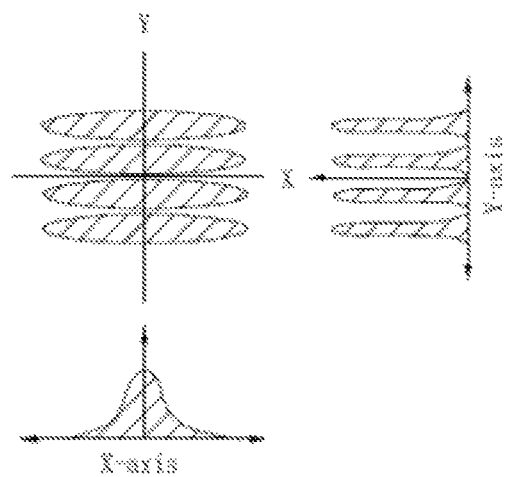
FIG. 5A is a schematic diagram of an angle distribution of light on an incident surface of a scattering element shown in FIG. 4.
Figure 5B:
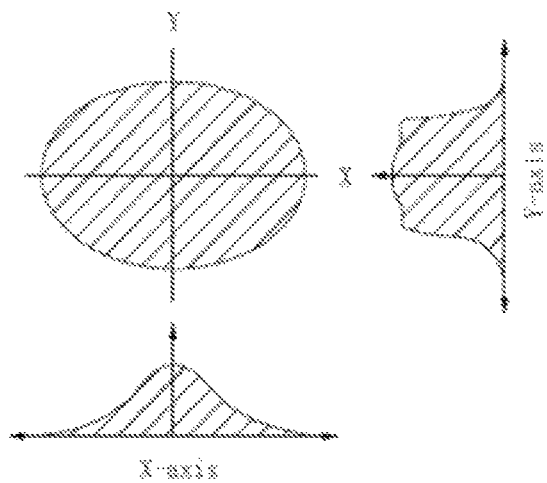
FIG. 5B is a schematic diagram of an angle distribution of light at an entrance of a light homogenizing device shown in FIG. 4.

Referring to FIG. 5 in combination with FIG. 4, FIG. 5A is a schematic diagram of an angle distribution of light on an incident surface of the scattering element 213 shown in FIG. 4, and FIG. 5B is a schematic diagram of an angle distribution of light at an entrance of the light homogenizing device 214 shown in FIG. 4.

In the accompanying drawings of the present disclosure, the Y-axis direction is identical to the above short-axis direction, and the X-axis is identical to the above long-axis direction in the drawings. The short-axis direction is vertical to the long-axis direction. It is understood that in an implementation, the short-axis may be inconsistent with the Y-axis direction, and the long-axis direction may be inconsistent with the X-axis direction. The short-axis direction and the long-axis direction may be other directions in the drawings. The first array 2111 may be a laser diode array so as to emit multiple beams of laser light as the multiple beams of first light. Since there is an interval among the multiple laser diodes in the first array 2111 and there is an interval between adjacent first reflection mirrors 2115a in the first mirror group 2115, the light beam array emitted from the first mirror group 2115 includes multiple light beams, i.e. there is an interval among the multiple light beams. Therefore, the light beam array will form multiple discrete first light spots on an incident side of the convergent lens 212. The angle distribution of the light incident to the scattering element 213 through the convergent lens 212 is discontinuous. As shown in FIG. 5A, the angle distribution of the light on the incident side of the scattering element 213 is multiple discrete elliptical Gaussian distributions.

In this implementation, the light beam array presents a linear arrangement in the short-axis (Y-axis) direction, i.e., the multiple first light spots present a linear arrangement in the short-axis direction. Correspondingly, a slice of the angle distribution of the light beam array in the long-axis (X-axis) direction presents a continuous Gaussian distribution, and a slice of the angle distribution of the light beam array in the short-axis direction presents multiple discrete Gaussian distributions. It is understood that in other implementations, the multiple first light spots may be distributed in an array.

Since a base of the laser diode is larger than a light-emitting surface thereof, each beam of first light emitted by the first array 2111 generally forms an elliptical light spot along a section vertical to a propagation direction thereof.

The multiple beams of first light emitted by the first array 2111 are reflected by the first mirror group 2115 to the surface of the convergent lens 212 to form multiple discrete first light spots. Each first light spot corresponds one beam of first light. Correspondingly, the angle distribution of each beam of laser light emitted by the laser diode is an elliptical Gaussian distribution. Specifically, as shown in FIG. 5A, each light beam in the light beam array has different divergence angles in two orthogonal directions (the long-axis direction and the short-axis direction), which presents the elliptical Gaussian angle distribution. Specifically, in the elliptical Gaussian angle distribution, the long-axis direction is parallel to the X-axis direction, and the short-axis direction is parallel to the Y-axis direction. Light emitted from the convergent lens 212 forms a continuous elliptical Gaussian distribution after being scattered by the scattering element 213, as shown in FIG. 5B. Specifically, light emitted from the scattering element 213 presents a continuous Gaussian distribution in the X-axis direction, and presents a continuous Gaussian distribution in the Y-axis direction.

As shown in FIG. 4, the interval between adjacent beams of first light emitted by the first array 2111 and that between adjacent first reflection mirrors 2115a are adjustable. Thus, by adjusting the interval between the adjacent beams of first light and the interval between the adjacent first reflection mirrors 2115a, the interval of the multiple first light spots on the convergent lens 212 in the short-axis direction is adjusted, such that a size of the overall profile formed by the multiple first light spots in the short-axis direction is smaller than that in the long-axis direction. That is, the overall profile of the multiple first light spots is in a shape of ellipse or strip. The long-axis direction of the overall profile is along the X-axis direction, and the short-axis direction thereof is along the Y-axis direction.

During the light beam array converging to the scattering element 213 through the convergent lens 212, a maximum height of the light beam entering into the convergent lens 212 can be converted to a maximum incident angle to the scattering element 213, according to h=f*tan θ. In the formula, h is a height of the light beam entering into the convergent lens 212, and f is a distance between the convergent lens 212 and the scattering element 213 along the optical axis. Since the light emitted from the convergent lens 212 are converged in the vicinity of the surface of the scattering element 213, f is approximately a focal length of the convergent lens. θ is an incident angle of the light incident to the scattering element 213. The scattering element 213 is used to scatter the incident light. An angle distribution range of the light emitted from the scattering element 213 has a positive relation with an angle distribution of the incident light. Specifically, multiple discrete incident light beams with a Gaussian distribution are converted to a short-spectrum light with an elliptical Gaussian distribution by the scattering element 213 and exit. That is, the incident light with a discrete angle distribution is converted to a short-spectrum light with the elliptical Gaussian distribution having a continuous angle distribution.

Figure 6A:
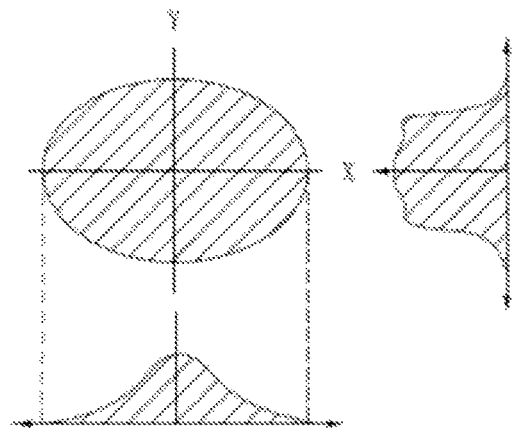
FIG. 6A is a schematic diagram of an angle distribution of a short-spectrum light on the incident surface of the total internal reflection prism shown in FIG. 4.
Figure 6B:
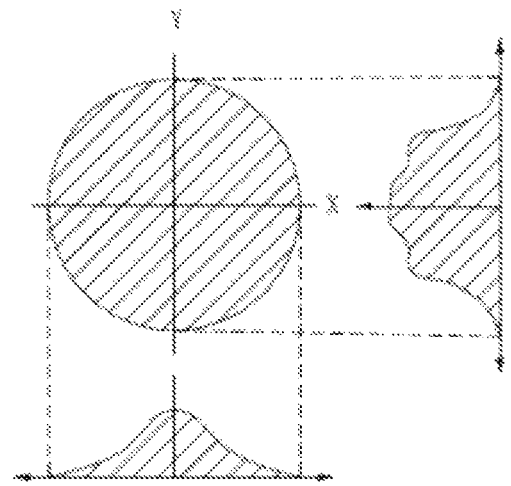
FIG. 6B is a schematic diagram of an angle distribution of incident light of a light modulation device shown in FIG. 4.

Referring to FIG. 6, FIG. 6A is a schematic diagram of an angle distribution of the short-spectrum light on the incident surface of the total internal reflection prism 901 as shown in FIG. 4, and FIG. 6B is a schematic diagram of an angle distribution of an incident light of the light modulation device 902 as shown in FIG. 4. According to an etendue theory, the angle distribution of the short-spectrum light emitted from the scattering element 213 is converted to the angle distribution of the short-spectrum light on the incident surface of the total internal reflection prism 901, and is directly proportional to the angle distribution of the short-spectrum light on the incident surface of the total internal reflection prism 901. The short-spectrum light is reflected on the surface of the total internal reflection prism 901 to generate a light to be modulated incident to the light modulation device 902.

The interval of the multiple first light spots on the convergent lens 212 in the short-axis direction and the angle distribution of the narrowband light emitted by the narrowband light source 210 can be adjusted by adjusting the interval between adjacent first light emitted by the first array 2111 and the interval between adjacent first reflection mirrors 2115a, such that the light to be modulated with an elliptical angle distribution emitted from the total internal reflection prism 901 is received by the light modulation device 902, to form a circular light spot. The light modulation device 902 is used for modulating the light to be modulated beam, to obtain an image light beam with a circular angle distribution. The diaphragm of the lens 903 is filled with the image light completely, increasing an image display quality of the display apparatus 20 on a basis of an implementation of a high-efficient optical utilization.

In addition, since an angle distribution of light in the whole display apparatus 20 is Gaussian distribution, a high proportion of the light beams are light beams with small angles. The light beams with small angles have a high transmittance and collection efficiency. Therefore, compared to a flat-topped distribution of Lambertian light through the optical system in the prior technology, the Gaussian distribution in the display apparatus 20 of the present disclosure has a relatively high light propagation efficiency and luminous efficiency.

In a modified implementation, the scattering element 213 is a micro-lens array or an elliptical Gaussian scattering sheet, which is used to perform homogenization on the light beam array and adjust the angle distribution thereof to a continuous elliptical distribution, to obtain the narrowband light. Although the laser light entering into the scattering element 213 have the same angle distribution in two orthogonal directions, e.g., a square or a circular angle distribution, the angle distribution of the light entering into the light homogenizing device 214 can be converted to the elliptical distribution by the scattering element 213.

Figure 7:
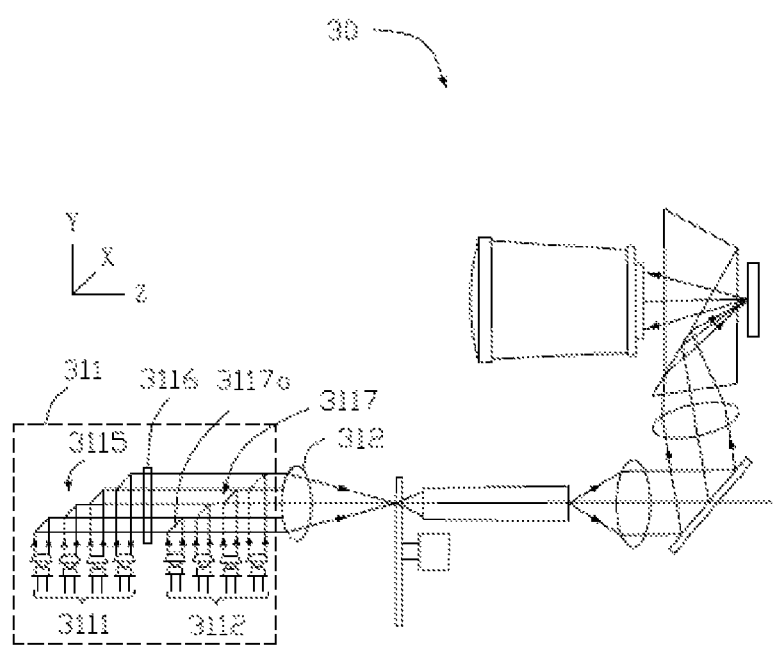
FIG. 7 is a structure schematic diagram of a display apparatus provided in a second implementation of the present disclosure.

Referring to FIG. 7, FIG. 7 is a structure schematic diagram of a display apparatus 30 provided in a second implementation of the present disclosure. This implementation differs from the first implementation mainly in that the display apparatus 30 includes a shaping light source 311, and the light emitting array of the shaping light source 311 includes a first array 3111 and a second array 3112 for emitting multiple beams of second light. The second light is laser light. The first light emitted by the first array 3111 and the second light emitted by the second array 3112 are both light with a first polarization state. The number of beams of first light emitted by the first array 3111 may be identical or non-identical to the number of beams of the second light emitted by the second array 3112. Besides a first mirror group 3115, the shaping component of the display apparatus 30 further includes a first polarization state conversion element 3116 and a first polarization light-combining component 3117. The first polarization state conversion element 3116 is used for performing polarization state conversion to the multiple beams of first light emitted from the first mirror group. That is, a first polarization state of the multiple beams of first light emitted from the first mirror group 3115 is converted to a second polarization state. The first polarization light-combining component 3117 includes multiple first polarization light-combining elements 3117a with a stepped arrangement, and the multiple first polarization light-combining elements 3117a are in a one-to-one correspondence with the multiple beams of second light emitted from the second array 3112. An interval is provided between adjacent first polarization light-combining elements 3117a. Each of the first polarization light-combining elements 3117a is used for guiding and combine by polarization one of the multiple beams of second light with one of multiple beams of first light emitted from the first polarization state conversion element 3116, to obtain a light beam array irradiating the convergent lens 312. Specifically, each first polarization light-combining element 3117a is used for transmission of the light with the second polarization state and reflecting the light with the first polarization state.

Figure 8A:
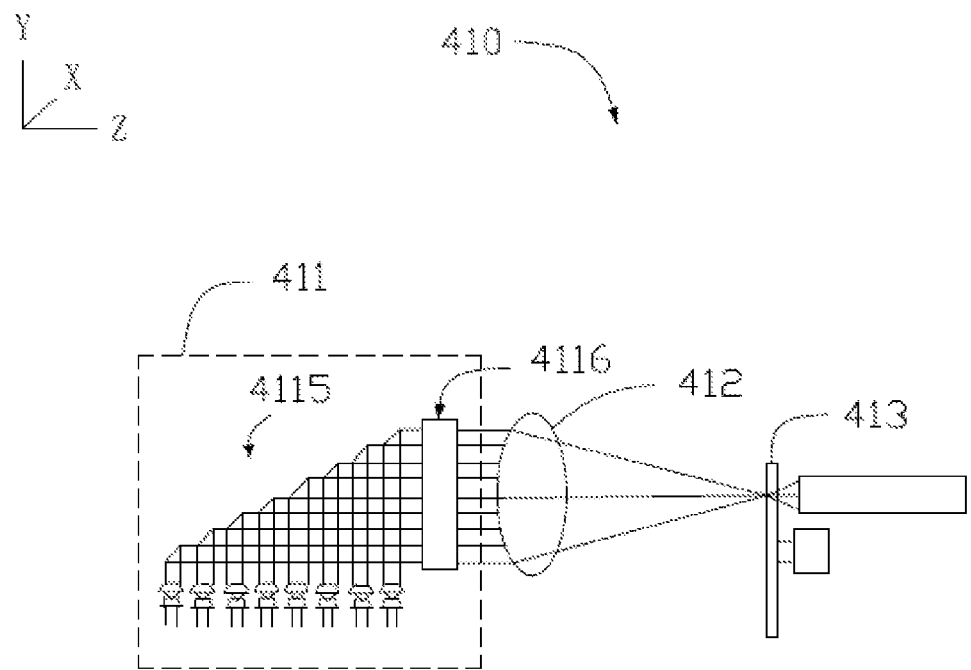
FIG. 8A is a local front-view structure schematic diagram of a narrowband light source in a display apparatus provided in a third implementation of the present disclosure.
Figure 8B:
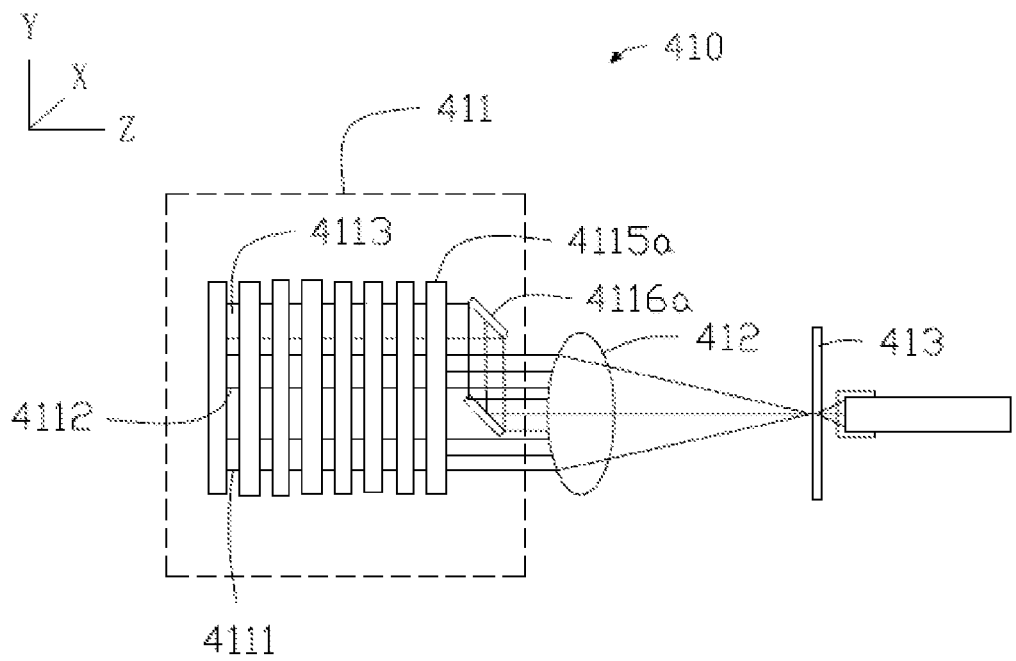
FIG. 8B is a local top-view structure schematic diagram of the narrowband light source shown in FIG. 8A.

Referring to FIG. 8A-FIG. 8B, FIG. 8A is a local front-view structure schematic diagram of a narrowband light source 410 in a display apparatus provided in a third implementation of the present disclosure, and FIG. 8B is a local top-view structure schematic diagram of the narrowband light source 410 shown in FIG. 8A. The narrowband light source 410 provided in this implementation differs from the narrowband light source 210 provided in the first implementation in the following. Besides the first array 4111, the light emitting array of the shaping light source 411 further includes a second array 4112 and a third array 4113. The second array 4112 is used for emitting multiple beams of second light, and the third array 4113 are used for emitting multiple beams of third light. The second light and the third light are both laser light. Each of the first light, the second light and the third light is reflected by a corresponding first reflection mirror 4115a of the first mirror group 4115. Then optical axes of the multiple beams of first light, the multiple beams of second light and the multiple beams of third light are arranged successively along the long-axis direction.

Herein, the optical axes of the multiple beams of first light, the multiple beams of second light, and the multiple beams of third light emitted from the first mirror group 4115 are respectively a first optical axis, a second optical axis, and a third optical axis. In the long-axis direction, a distance between the second optical axis and the first optical axis is larger than that between the second optical axis and the third optical axis. That is, an interval between the multiple beams of first light and the multiple beams of second light emitted from the first reflection mirror 4115a is relatively large, which may result in a non-uniform distribution of light beams in the light beam array. Thus, the homogeneity of the light emitted from the shaping light source 411 may be affected. Therefore, it is necessary to adjust at least one beam of third light from an edge of the multiple beams of laser light to a larger interval space in the multiple beams of laser light, thus reducing a size of the light beam array in the long-axis direction.

The shaping component further includes a second mirror group 4116 which includes multiple second reflection mirrors 4116a. After one beam of third light emitted from at least one of first reflection mirror 4115a is reflected through a corresponding second reflection mirror 4116a, the optical axis of at least one beam of third light emitted from the corresponding second reflection mirror 4116a is located between the optical axes of the multiple beams of the first light and the multiple beams of the second light emitted from the first mirror group 4115, in the long-axis direction. The multiple beams of first light and the multiple beams of second light emitted from the first mirror group 4115, and at least one beam of third light emitted from the second mirror group 4116 are emitted in the same direction, to obtain the light beam array.

In this implementation, the multiple second reflection mirrors 4116a in the second mirror group 4116 are arranged successively in the long-axis direction, to change a propagation path of the third light in the long-axis direction. All third light emitted from the third array 4113 pass through a corresponding first reflection mirror 4115a and a corresponding second reflection mirror 4116a successively, to adjust the third light located at an edge in the multiple beams of laser light emitted from the first mirror group 4115 to a location between the multiple beams of first light and the multiple beams of second light. An interval between adjacent second reflection mirrors 4116a is adjustable. By adjusting the interval between adjacent second reflection mirrors, an interval of the multiple first light spots on the convergent lens 412 in the long-axis direction is adjusted, and thus an angle distribution of the short-spectrum light emitted from the scattering element 413 in the long-axis direction is adjusted.

Figure 9A:
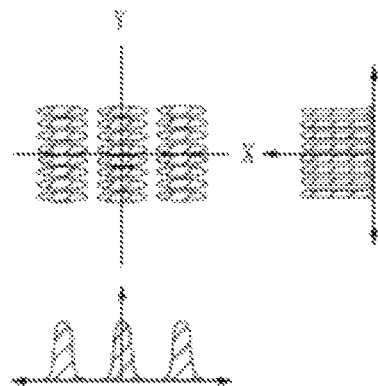
FIG. 9A is a schematic diagram of an angle distribution of a light beam array on an incident surface of the scattering element shown in FIG. 8.
Figure 9B:
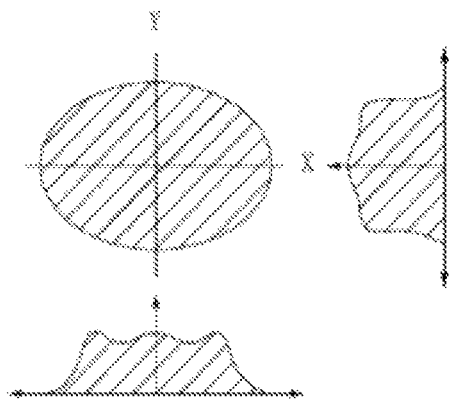
FIG. 9B is a schematic diagram of an angle distribution of light at an entrance of a light homogenizing device shown in FIG. 8.

As shown in FIG. 9, FIG. 9A is a schematic diagram of an angle distribution of the light beam array on an incident surface of the scattering element 413 shown in FIG. 8, and FIG. 9B is a schematic diagram of an angle distribution of light at an entrance of the light homogenizing device 414 shown in FIG. 8.

As shown in FIG. 9A, the angle distribution of the light at an incident side of the scattering element 413 is formed by multiple discrete Gaussian elliptical distributions. The multiple Gaussian elliptical distributions located in a middle column (in the Y-axis direction) are from multiple beams of third light. Intervals among the multiple discrete Gaussian elliptical distributions are approximately equal. As shown in FIG. 9B, the scattering element 413 converts the light beam array with an incident angle in conformity with a discrete elliptical Gaussian distribution into a short-spectrum light with an angle distribution in conformity with a successive Gaussian elliptical distribution and then exits the converted light.

If no second mirror group 4116 is added in this implementation, the scattering element 413 cannot scatter the incident laser light beams with a Gaussian distribution to be light with the Lambertian distribution. Therefore, the scattering element 4116 will not convert the light beam array with a non-uniform arrangement emitted from the convergent lens 412 to a short-spectrum light for exiting.

In this implementation, on one hand, the second mirror group 4116 is used to adjust the homogeneity of the short-spectrum light emitted from the shaping light source 411, which is advantageous to increase a quality of the output image of the display apparatus. On the other hand, the first mirror group 4115 is used in combination with the second mirror group 4116 to achieve compression of the light beam array in two dimensions (both in the long-axis direction and the short-axis direction), which is advantageous to increase the homogeneity in a distribution of the short-spectrum light and to flexibly adjust the angle distribution of the short-spectrum light emitted from the shaping light source 411.

Figure 10:
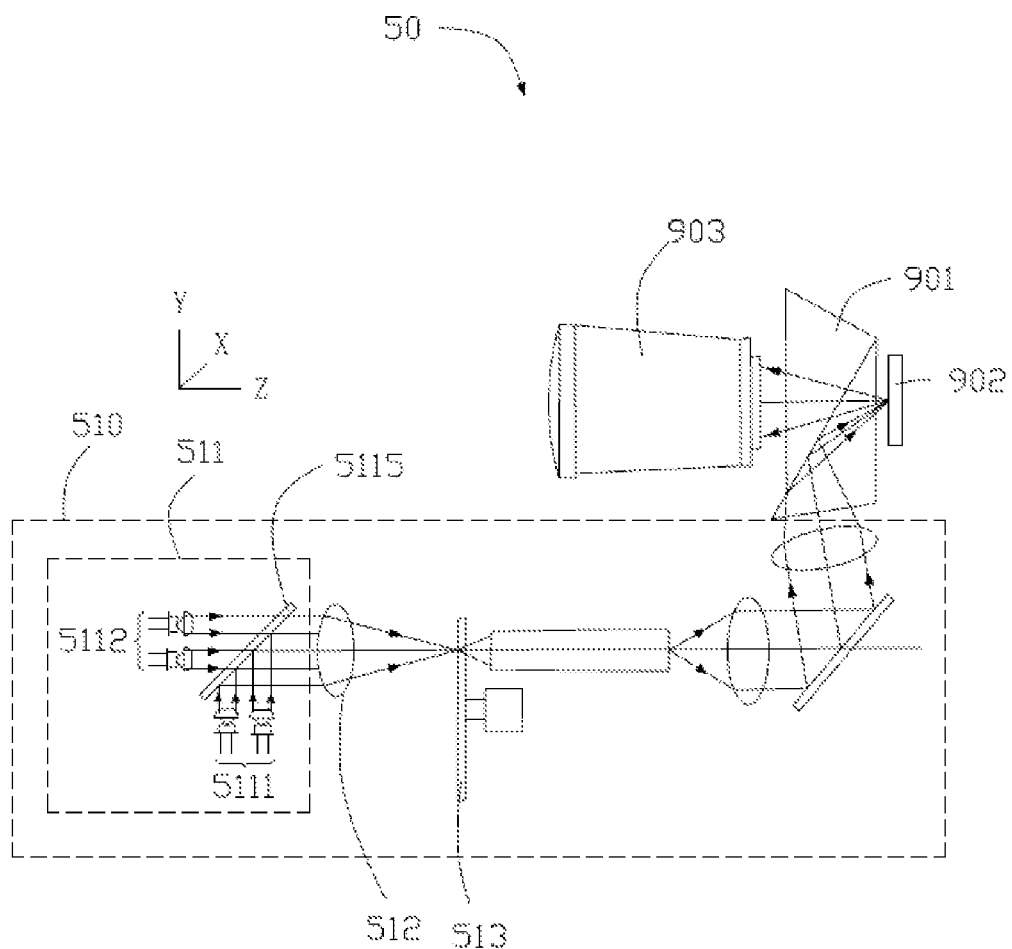
FIG. 10 is a structure schematic diagram of a display apparatus provided in a fourth implementation of the present disclosure.

Referring to FIG. 10, FIG. 10 is a structure schematic diagram of a display apparatus 50 provided in a fourth implementation of the present disclosure. The display apparatus 50 differs from the display apparatus 20 provided in the first implementation mainly in that the narrowband light source 510 in the display apparatus device 50 is different from the narrowband light source 210 in the display apparatus 20.

Specifically, the narrowband light source 510 includes a shaping light source 511 which includes a first array 5111 for emitting multiple beams of first light and a second array 5112 for emitting multiple beams of second light. The first light and the second light are both laser light. The shaping component includes a first light-combining element 5115 for guiding and combining the multiple beams of first light with the multiple beams of second light, to obtain a light beam array incident to the convergent lens 512.

Figure 11:
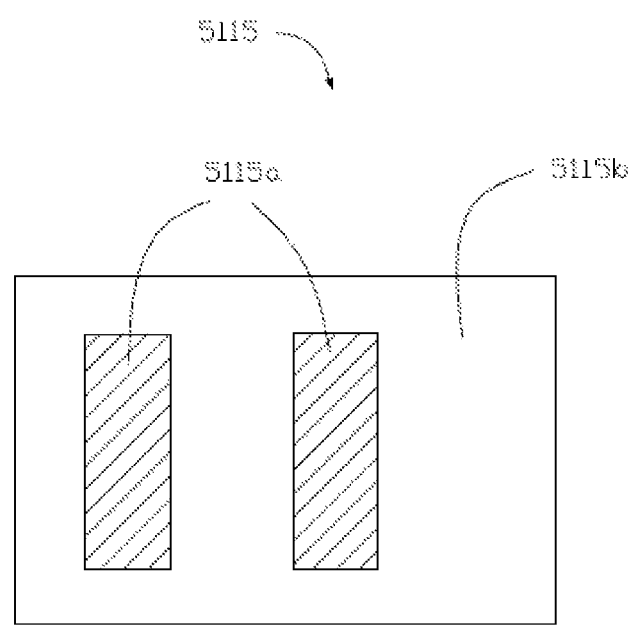
FIG. 11 is a top-view structure schematic diagram of a first light-combining element shown in FIG. 10.

Referring to FIG. 11, FIG. 11 is a top-view structure schematic diagram of the first light-combining element 5115 shown in FIG. 10. The first light-combining element 5115 includes a film-coated area 5115a and a non-film-coated area 5115b. Herein, the first light-combining element 5115 includes two spaced film-coated areas 5115a which are provided with an identical optical film. The first light-combining element 5115 may perform wavelength light combination or polarization light combination according to wavelengths and polarization states of the first light and the second light. Correspondingly, the film-coated area 5115a and the non-film-coated area 5115b may be provided with a wavelength splitting film or a polarization splitting film. It is understood that any other number of film-coated areas 5115a may be provided flexibly on the first light-combining element 5115 according to the arrangement of the first array 5111 and the second array 5112.

Multiple beams of first light is directed to the film-coated area 5115a, and multiple beams of second light irradiate on the non-film-coated area 5115b. The film-coated area 5115a and the non-film-coated area 5115b are used for guiding the multiple beams of first light and the multiple beams of second light to exit along the same light path, to obtain the light beam array. Specifically, the film-coated area 5115a is used for reflecting the multiple beams of first light and the non-film-coated area 5115b is used for transmission of the multiple beams of second light.

An interval between adjacent film-coated areas 5115a is adjustable. By adjusting the interval between adjacent film-coated areas 5115a to adjust an interval of the multiple first light spots on the convergent lens 512 in the short-axis direction, an angle distribution of the light beams incident to the scattering element 513 in the short-axis direction is adjusted.

Figure 12:
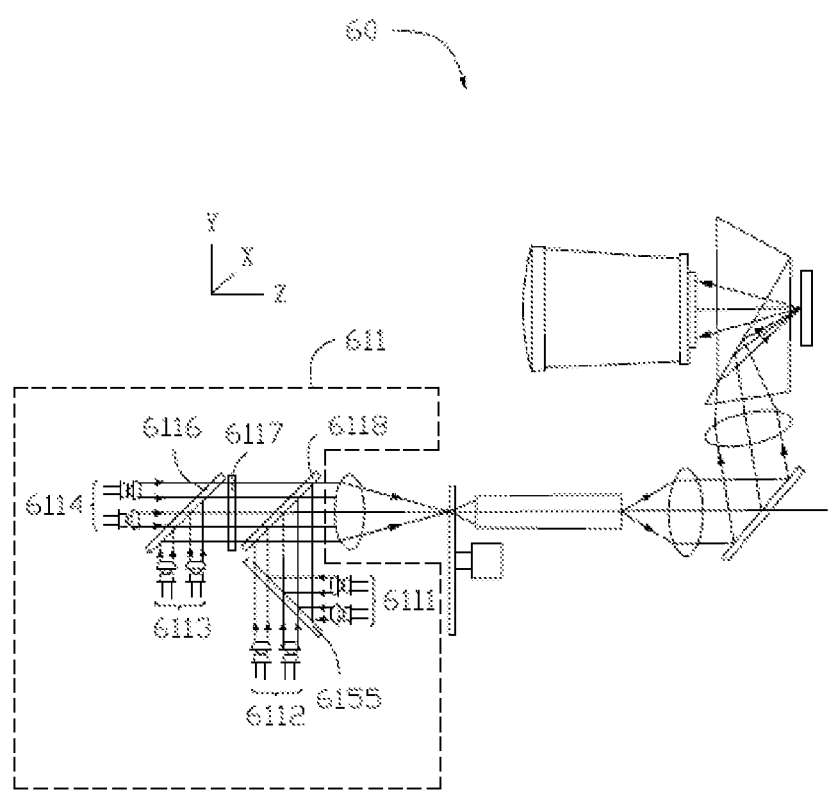
FIG. 12 is a structure schematic diagram of a display apparatus provided in a fifth implementation of the present disclosure.

Referring to FIG. 12, FIG. 12 is a structure schematic diagram of a display apparatus 60 provided in a fifth implementation of the present disclosure. The display apparatus 60 differs from the display apparatus 50 mainly in that the light emitting array of the shaping light source 611 not only includes the first array 6111 and the second array 6112, but also includes a third array 6113 for emitting multiple beams of third light and a fourth array 6114 for emitting multiple beams of fourth light. The third light and the fourth light are both laser light. Each of the first light, the second light, the third light, and the fourth light is light with a first polarization state. The shaping component further includes a second light-combining element 6116, a second polarization state conversion element 6117 and a second polarization light-combining component 6118. The second light-combining element 6116 is used for guiding the multiple beams of third light to perform light combination with the multiple beams of fourth light. The second polarization state conversion element 6117 is used for converting the light with the first polarization state emitted from the second light-combining element 6116 to light with a second polarization state. The second polarization light-combining element 6118 is used for guiding the light with the first polarization state emitted from the first light-combining element 6115 and the light with the second polarization state emitted from the second polarization state conversion element 6117, to perform polarization light combination and obtain the light beam array.

Specifically, structures of the first light-combining element 6115, the second light-combining element 6116 and the second polarization light-combining component 6118 may make reference to that of the first light-combining element 5115. It is understood that the first light-combining element 6115, the second light-combining element 6116 and the second polarization light-combining component 6118 may be other structures that can perform the light combination on incident light. Additionally, a film-coated area of the second polarization light-combining component 6118 is provided with a polarization light-splitting film. Specifically, the second light-combining component 6118 is used for reflecting the light with the first polarization state and for the transmission of the light with the second polarization state.

Figure 13:
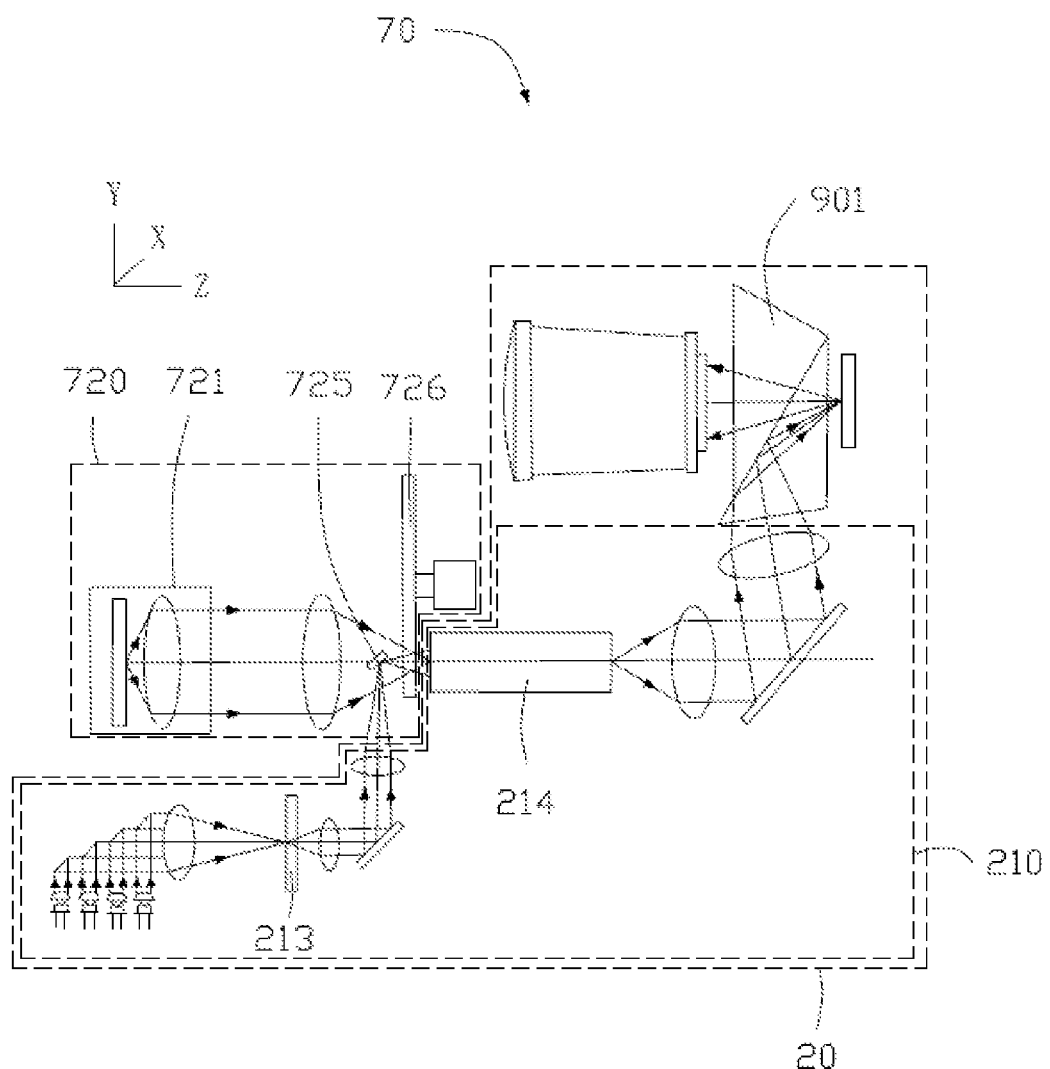
FIG. 13 is a structure schematic diagram of a display system provided in a sixth implementation of the present disclosure.

Referring to FIG. 13, FIG. 13 is a structure schematic diagram of a display system 70 provided in a sixth implementation of the present disclosure. The display system 70 includes a wideband light source 720 and a display apparatus provided in any one of the above implementations. In this implementation, the display apparatus 20 in the first implementation is take as an example for illustration. It is understood that in an alternative implementation, the display apparatus 30, 40, 50, 60, or a display apparatus of another type obtained by a person skilled in the art through performing modifications with conventional technical means or common knowledge based on the display apparatus provided in the present disclosure may also be applied to replace the display apparatus 20.

Specifically, the wideband light source 720 is used for emitting a wideband light for modulating an image in a first color gamut. The narrowband light emitted from the narrowband light source 210 in the display apparatus 20 is used for modulating an image in a second color gamut. Here, the second color gamut covers the first color gamut and has a part beyond the first color gamut. Etendue light combination is performed on the wideband light and the narrowband light, and then the combination light is emitted from the light homogenizing device 214.

The wideband light source 720 further includes a light emitting body 721, a reflection mirror 725 and a wavelength conversion device 726. The light emitting body 721 may be a light emitting body for emitting a Lambertian light, such as a lamp bulb, a light emitting diode or phosphor. The narrowband light emitted from the scattering element 213 in the narrowband light source 210 converges in the vicinity of the reflection mirror 725. The wideband light is in an out-of-focus state at a location of the reflection mirror 725. Etendue light combination is performed on the wideband light and the narrowband light at the reflection mirror 725. In this implementation, the wideband light source 720 further includes the wavelength conversion device 726, such as a color wheel or a fixed phosphor piece. The light emitted from the reflection mirror 725 enters into the light homogenizing device 214 in the narrowband light source 210 through the wavelength conversion device 726, and irradiates to the total internal reflection prism 901.

In the whole display system 70, the narrowband light with an elliptical distribution and a higher lighting efficiency which is emitted from the narrowband light source 210 according to the above embodiments is used for perform light combination with wideband light with the Lambertian distribution which is emitted from the wideband light source 720, and then light modulation is performed. Compared to a conventional light source, it is possible to add less lasers to achieve a wide color gamut, which is advantageous to reduce a cost and bulk of the display system 70.

It should be noted that each specific solution in each implementation may be applicable for another within a range of the spirit or basic features of the present disclosure, which is not repeated herein for simplifying description and avoiding repetition.

It is obvious for a person skilled in the art that the present disclosure is not limited to details of the above exemplary embodiments and it is possible to embody the present disclosure in other specific ways without deviating from the spirit or basic features of the present disclosure. Therefore, from any point of view, embodiments should be considered to be exemplary and non-limited. A scope of the present disclosure is limited by appending claims rather than the above description. Thus, any variations intended to fall within meanings and the scope equivalent to the claims are covered by the present disclosure. Any reference numerals in the claims should not be considered to limit the related claims. In addition, it is obviously that the word "comprise" is used without excluding other units or steps, and a singular form is used without excluding the use a plural form. Multiple devices described in a device claim may also be implemented by a single device or system through software or hardware. The word such as "first", "second" and so on is used for representing a name, while not any particular order.

Finally it is stated that the above embodiments are only used for illustrating but not for limiting the technical solution of the present disclosure. Although specific description is made to the present disclosure with reference to preferable embodiments, a person skilled in the art should understand that the technical solution of the present disclosure can be modified and alternated without deviating from the spirit and the scope of the technical solution of the present disclosure.

The invention claimed is:

1. A display apparatus, comprising:
 a narrowband light source configured to emit narrowband light with an elliptical distribution;
 a reflection device comprising a reflection surface, wherein the reflection surface is configured to reflect the narrowband light to obtain light to be modulated; and
 a light modulation device configured to modulate the light to be modulated, to obtain image light of an image to be displayed, wherein the light modulation device comprises a modulating surface configured to receive the light to be modulated, the modulating surface is at a preset angle to an optical axis of the light to be modulated such that the light to be modulated forms a circular light spot on the modulating surface.

2. The display apparatus according to claim 1, wherein the narrowband light source comprises a shaping light source, a convergent lens and a scattering element;
 wherein the shaping light source is configured to emit a light beam array comprising laser light, the light beam array forms a plurality of discrete first light spots on the convergent lens, the light beam array are converged in a vicinity of the scattering element through the convergent lens, and the scattering element is configured to scatter the converged light beam array to obtain the narrowband light.

3. The display apparatus according to claim 2, wherein the shaping light source comprises:
 a light emitting array configured to emit a plurality of beams of laser light;

a shaping component configured to guide the plurality of beams of laser light to emit along a same optical path to obtain the light beam array, and to adjust an interval of the plurality of first light spots on the convergent lens in a short-axis direction of the elliptical distribution, such that a size of an overall profile of the plurality of first light spots in the short-axis direction is smaller than or equal to a size of the overall profile of the plurality of first light spots in a long-axis direction of the elliptical distribution.

4. The display apparatus according to claim 3, wherein the scattering element is a micro-lens array or an elliptical Gaussian scattering sheet; and the scattering element is configured to perform homogenization on the light beam array and adjust an angle distribution of the light beam array to an elliptical distribution, to obtain the narrowband light.

5. The display apparatus according to claim 3, wherein the light emitting array comprises a first array configured to emit a plurality of beams of first light, wherein the first light comprises laser light; and wherein the shaping component comprises a first mirror group, the first mirror group comprises a plurality of first mirrors in a stepped arrangement, the plurality of first mirrors is in a one-to-one correspondence with the plurality of beams of first light, and each of the plurality of beams of first light is reflected to the convergent lens through a corresponding first reflection mirror.

6. The display apparatus according to claim 5, wherein an interval between adjacent beams of first light and an interval between adjacent first reflection mirrors are adjustable; and by adjusting the interval between adjacent beams of first light and the interval between adjacent first reflection mirrors, an interval of the plurality of first light spots on the convergent lens in the short-axis direction is adjusted.

7. The display apparatus according to claim 5, wherein the light emitting array further comprises a second array configured to emit a plurality of beams of second light, and the second light comprises laser light;

wherein the shaping component further comprises:
a first polarization state conversion element configured to perform polarization state conversion on the plurality of beams of first light emitted from the first mirror group;
a first polarization light-combining component comprising a plurality of first polarization light-combining elements in a stepped arrangement, wherein the plurality of first polarization light-combining elements is in a one-to-one correspondence with the plurality of beams of second light emitted from the second array, each of the plurality of first polarization light-combining elements is configured to guide and combine by polarization one of the plurality of beams of second light with one of the plurality of beams of first light emitted from the first polarization state conversion element, to obtain the light beam array for irradiating the convergent lens.

8. The display apparatus according to claim 5, wherein the light emitting array further comprises a second array configured to emit a plurality of beams of second light, and a third array configured to emit a plurality of beams of third light, wherein the second light and the third light are both laser light;

after each of the plurality of beams of the first light, the second light and the third light is reflected by a corresponding one of the first mirror group, optical axes of the plurality of beams of first light, the plurality of beams of second light and the plurality of beams of third light are arranged successively along the long-axis direction; and the shaping component further comprises a second mirror group comprising a plurality of second reflection mirrors, wherein after at least one beam of third light emitted from the first reflection mirror is reflected by a corresponding second reflection mirror, an optical axis of the third light emitted from the corresponding second reflection mirror is located between optical axes of the first light and the second light emitted from the first mirror group in the long-axis direction; and the plurality of beams of first light and the plurality of beams of second light emitted from the first mirror group, and the at least one beam of third light emitted from the second mirror group are emitted along a same direction, to obtain the light beam array.

9. The display apparatus according to claim 8, wherein an optical axis of the plurality of beams of first light emitted from the first mirror group is a first optical axis, an optical axis of the plurality of beams of second light emitted from the first mirror group is a second optical axis, and an optical axis of the plurality of beams of third light emitted from the first mirror group is a third optical axis, wherein in the long-axis direction, a distance between the second optical axis and the first optical axis is larger than a distance between the second optical axis and the third optical axis.

10. The display apparatus according to claim 8, wherein an interval between adjacent second reflection mirrors is adjustable, wherein by adjusting the interval between adjacent second reflection mirrors, an interval of the plurality of first light spots on the convergent lens in the long-axis direction is adjusted.

11. The display apparatus according to claim 3, wherein the light emitting array comprises:
a first array configured to emit a plurality of beams of first light, the first light being laser light; and
a second array configured to emit a plurality of beams of second light, the second light being laser light,
wherein the shaping component comprises:
a first light-combining element configured to combine the plurality of beams of first light and the plurality of beams of second light, to obtain the light beam array for irradiating the convergent lens.

12. The display apparatus according to claim 11, wherein the first light-combining element comprises a film-coated area and a non-film-coated area, wherein the plurality of beams of first light are directed to the film-coated area, and the plurality of beams of second light are directed to the non-film-coated area, the film-coated area and the non-film-coated area are configured to guide the plurality of beams of first light and the plurality of beams of second light to exit along a same light path, to obtain the light beam array.

13. The display apparatus according to claim 12, wherein an interval between adjacent film-coated areas is adjustable; and by adjusting the interval between adjacent film-coated areas, an interval of the plurality of first light spots on the convergent lens in the short-axis direction is adjusted.

14. The display apparatus according to claim 11, wherein the light emitting array comprises:
a third array configured to emit a plurality of beams of third light, the third light being laser light; and
a fourth array configured to emit a plurality of beams of fourth light, the fourth light being laser light,
wherein the first light, the second light, the third light and the fourth light are light with a first polarization state;

wherein the shaping component further comprises:
- a second light-combining element configured to guide and combine the plurality of beams of third light with the plurality of beams of fourth light;
- a second polarization state conversion element configured to convert light with the first polarization state emitted from the second light-combining element into light with a second polarization state; and
- a second polarization light-combining component configured to guide and combine by polarization the light with the first polarization state emitted from the first light-combining element with the light with the second polarization state emitted from the second polarization state conversion element, to obtain the light beam array.

15. The display apparatus according to claim 2, wherein the scattering element is a micro-lens array or an elliptical Gaussian scattering sheet; and the scattering element is configured to perform homogenization on the light beam array, and to adjust an angle distribution of the light beam array to an elliptical distribution, so as to obtain the narrowband light.

16. A display system, comprising a wideband light source and a display apparatus, wherein the display apparatus comprises:
- a narrowband light source configured to emit narrowband light with an elliptical distribution;
- a reflection device comprising a reflection surface, wherein the reflection surface is configured to reflect the narrowband light to obtain light to be modulated; and
- a light modulation device configured to modulate the light to be modulated, to obtain image light of an image to be displayed, wherein the light modulation device comprises a modulating surface configured to receive the light to be modulated, the modulating surface is at a preset angle to an optical axis of the light to be modulated such that the light to be modulated forms a circular light spot on the modulating surface, and
- wherein the wideband light source is configured to emit wideband light for modulation for an image in a first color gamut, and the narrowband light emitted from the narrowband light source is used for modulation for an image in a second color gamut, wherein the second color gamut covers the first color gamut and the second color gamut has a part beyond the first color gamut, and the wideband light and the narrowband light are combined by etendue to irradiate the reflection device.

17. The display system according to claim 16, wherein the wideband light source further comprises a reflection mirror, wherein the narrowband light emitted from the scattering element in the narrowband light source converges in a vicinity of the reflection mirror, the wideband light is in an out-of-focus state at the reflection mirror, and the wideband light and the narrowband light are combined by etendue at the reflection mirror.

18. The display system according to claim 16, wherein the narrowband light source comprises a shaping light source, a convergent lens and a scattering element;
- wherein the shaping light source is configured to emit a light beam array comprising laser light, the light beam array forms a plurality of discrete first light spots on the convergent lens, the light beam array are converged in a vicinity of the scattering element through the convergent lens, and the scattering element is configured to scatter the converged light beam array to obtain the narrowband light.

19. The display system according to claim 18, wherein the shaping light source comprises:
- a light emitting array configured to emit a plurality of beams of laser light;
- a shaping component configured to guide the plurality of beams of laser light to emit along a same optical path to obtain the light beam array, and to adjust an interval of the plurality of first light spots on the convergent lens in a short-axis direction of the elliptical distribution, such that a size of an overall profile of the plurality of first light spots in the short-axis direction is smaller than or equal to a size of the overall profile of the plurality of first light spots in a long-axis direction of the elliptical distribution.

20. A display apparatus, comprising:
a narrowband light source configured to emit narrowband light with an elliptical distribution;
a reflection device comprising a reflection surface, wherein the reflection surface is configured to reflect the narrowband light to obtain light to be modulated; and
a light modulation device configured to modulate the light to be modulated, to obtain image light of an image to be displayed, wherein the light modulation device comprises a modulating surface configured to receive the light to be modulated, the modulating surface is at a preset angle to an optical axis of the light to be modulated such that the light to be modulated forms a circular light spot on the modulating surface, wherein the light to be modulated from the reflection surface is directly incident on the modulating surface.

* * * * *